(12) United States Patent
Juenger et al.

(10) Patent No.: US 9,711,767 B2
(45) Date of Patent: Jul. 18, 2017

(54) LAWN-CARE APPARATUS WITH AN ACCESSIBLE BATTERY COMPARTMENT

(71) Applicant: Robert Bosch GmbH, Stuttgart (DE)

(72) Inventors: Dennis Juenger, Ipswich (GB);
Matthew Ling, Ipswich Suffolk (GB);
Gavin Ben Armstrong, Elmswell Suffolk (GB); Mathew Price, Cambridge (GB)

(73) Assignee: Robert Bosch GmbH, Stuttgart (DE)

(*) Notice: Subject to any disclaimer, the term of this patent is extended or adjusted under 35 U.S.C. 154(b) by 811 days.

(21) Appl. No.: 13/782,685

(22) Filed: Mar. 1, 2013

(65) Prior Publication Data

US 2013/0239533 A1 Sep. 19, 2013

(30) Foreign Application Priority Data

Mar. 7, 2012 (EP) .................... 12158420

(51) Int. Cl.
*H02P 1/00* (2006.01)
*H01M 2/10* (2006.01)
*A01D 69/02* (2006.01)
*A01D 34/00* (2006.01)

(52) U.S. Cl.
CPC ........ *H01M 2/1083* (2013.01); *A01D 34/001* (2013.01); *A01D 69/02* (2013.01)

(58) Field of Classification Search
CPC ........ A01D 69/02; A01D 34/78; A01D 34/58; A01D 2101/00; A01D 69/025; A01B 33/028; B60L 11/1877; B60L 11/1822; B60L 11/1805; H02J 7/044; H02J 7/0045; H01M 2/1055

USPC ......... 56/11.9, 16.7; 320/113, 112, 106, 107, 320/114; 172/42; 37/246, 244; D15/17; 173/117; 429/100, 96, 98, 163; D13/103
See application file for complete search history.

(56) References Cited

U.S. PATENT DOCUMENTS

| 3,973,378 | A | | 8/1976 | Bartasevich et al. |
| 4,435,486 | A | * | 3/1984 | Pomaro et al. .................... 429/1 |
| 4,756,978 | A | * | 7/1988 | Nitcher et al. .................... 429/1 |
| 4,930,300 | A | * | 6/1990 | Benter .................. A01D 34/81 248/302 |
| 5,085,043 | A | * | 2/1992 | Hess et al. ...................... 56/10.5 |
| 5,228,531 | A | * | 7/1993 | Patterson et al. ............ 180/68.5 |
| 5,360,307 | A | * | 11/1994 | Schemm .................. B60K 1/04 104/34 |
| 5,402,626 | A | * | 4/1995 | Zinck .............................. 56/11.9 |
| D361,771 | S | * | 8/1995 | Ledingham .................... D15/14 |
| 5,606,851 | A | * | 3/1997 | Bruener et al. ................. 56/11.9 |
| 5,619,845 | A | * | 4/1997 | Bruener ............ A01D 34/6806 320/137 |

(Continued)

FOREIGN PATENT DOCUMENTS

| CN | 101522017 A | | 9/2009 | |
| EP | 2160937 A1 | * | 3/2010 | ............. B62D 51/06 |

(Continued)

*Primary Examiner* — Árpád Fábián-Kovács
(74) *Attorney, Agent, or Firm* — Maginot, Moore & Beck LLP (57) ABSTRACT

A lawn-care apparatus includes a battery-compartment having an access opening and a roof section. The roof section is configured to provide cover to the battery-compartment. A battery may be inserted into the battery-compartment through the access opening without displacing the roof section.

16 Claims, 5 Drawing Sheets

(56) References Cited

U.S. PATENT DOCUMENTS

| | | | | |
|---|---|---|---|---|
| 5,633,095 A * | 5/1997 | Ishikawa et al. | | 429/1 |
| 5,727,372 A * | 3/1998 | Kanitz et al. | | 56/11.9 |
| 5,910,091 A * | 6/1999 | Iida et al. | | 56/16.7 |
| RE36,250 E * | 7/1999 | Hess | | A01D 34/828 |
| | | | | 307/328 |
| 5,934,053 A * | 8/1999 | Fillman et al. | | 56/11.9 |
| 5,937,623 A * | 8/1999 | Wolf | | 56/11.9 |
| 6,170,179 B1 * | 1/2001 | Paytas et al. | | 37/246 |
| 6,487,837 B1 * | 12/2002 | Fillman et al. | | 56/11.9 |
| 6,498,457 B1 * | 12/2002 | Tsuboi | | 320/110 |
| 6,525,511 B2 * | 2/2003 | Kubale | | B25F 5/02 |
| | | | | 320/112 |
| 6,758,030 B2 * | 7/2004 | Dettmann | | 56/11.9 |
| 6,802,175 B2 * | 10/2004 | Fillman | | A01D 34/58 |
| | | | | 56/11.9 |
| 7,007,446 B2 * | 3/2006 | Dettmann | | 56/11.9 |
| 7,111,443 B2 * | 9/2006 | Anderson | | A01D 34/47 |
| | | | | 56/10.8 |
| 7,320,843 B2 * | 1/2008 | Harrington | | 429/97 |
| 7,413,045 B2 * | 8/2008 | Tien | | 180/68.5 |
| 7,434,642 B2 * | 10/2008 | Dettmann | | A01D 34/58 |
| | | | | 180/68.5 |
| 7,479,754 B2 * | 1/2009 | Lucas et al. | | 318/599 |
| 7,540,132 B2 * | 6/2009 | Shimada et al. | | 56/11.9 |
| D614,125 S * | 4/2010 | Tinius | | D13/103 |
| 7,728,534 B2 * | 6/2010 | Lucas | | A01D 69/025 |
| | | | | 318/139 |
| 7,741,793 B2 * | 6/2010 | Lucas et al. | | 318/139 |
| D620,030 S * | 7/2010 | Baetica | | D15/14 |
| D627,372 S * | 11/2010 | Baetica | | D15/14 |
| 7,963,344 B2 * | 6/2011 | Marcil et al. | | 172/43 |
| 7,989,969 B2 * | 8/2011 | Grant | | F02B 63/04 |
| | | | | 290/1 A |
| 8,037,669 B2 * | 10/2011 | Hansen | | A01D 34/81 |
| | | | | 56/11.9 |
| 8,097,359 B2 * | 1/2012 | Gau et al. | | 429/187 |
| 8,162,072 B2 * | 4/2012 | Marcil | | A01B 33/028 |
| | | | | 172/125 |
| 8,653,786 B2 * | 2/2014 | Baetica | | A01D 34/78 |
| | | | | 320/104 |
| 8,910,459 B2 * | 12/2014 | Abe et al. | | 56/11.9 |
| 2006/0090439 A1 * | 5/2006 | Anderson et al. | | 56/10.2 G |
| 2008/0098703 A1 * | 5/2008 | Lucas et al. | | 56/11.9 |
| 2008/0196553 A1 * | 8/2008 | Hoffmann | | B25F 5/02 |
| | | | | 81/54 |
| 2009/0262266 A1 * | 10/2009 | Harbin | | H02J 7/0045 |
| | | | | 349/1 |
| 2009/0266042 A1 * | 10/2009 | Mooney et al. | | 56/11.9 |
| 2010/0051299 A1 * | 3/2010 | Marcil | | A01B 33/028 |
| | | | | 172/42 |
| 2010/0162674 A1 | 7/2010 | Eaton et al. | | |
| 2010/0269474 A1 * | 10/2010 | Hansen et al. | | 56/16.7 |
| 2010/0275564 A1 * | 11/2010 | Baetica et al. | | 56/11.9 |
| 2011/0088362 A1 * | 4/2011 | Rosa et al. | | 56/11.9 |
| 2012/0317948 A1 * | 12/2012 | Abe | | A01D 34/828 |
| | | | | 56/10.5 |
| 2012/0317949 A1 * | 12/2012 | Abe | | A01D 34/6818 |
| | | | | 56/10.5 |
| 2012/0317950 A1 * | 12/2012 | Abe | | A01D 34/81 |
| | | | | 56/11.9 |
| 2012/0321912 A1 * | 12/2012 | Hachisuka | | H01M 2/1022 |
| | | | | 429/7 |
| 2013/0312382 A1 * | 11/2013 | Kokawa | | A01D 34/82 |
| | | | | 56/17.5 |
| 2014/0083787 A1 * | 3/2014 | Lyons | | B60R 16/04 |
| | | | | 180/68.5 |
| 2014/0196425 A1 * | 7/2014 | Lewis | | H02J 7/0068 |
| | | | | 56/16.7 |

FOREIGN PATENT DOCUMENTS

| | | | | |
|---|---|---|---|---|
| FR | 2768298 A1 * | 3/1999 | | A01D 69/02 |
| IT | EP 2556739 A1 * | 2/2013 | | A01D 34/6806 |
| JP | 2011003656 A * | 1/2011 | | H01M 2/10 |
| WO | WO 2008015479 A2 * | 2/2008 | | A01D 69/02 |

* cited by examiner

LAWN-CARE APPARATUS WITH AN ACCESSIBLE BATTERY COMPARTMENT

This application claims priority under 35 U.S.C. §119 to patent application no. EP 12158420.5-2313, filed on Mar. 7, 2012, the disclosure of which is incorporated herein by reference in its entirety.

BACKGROUND

The present disclosure relates to a lawn-care apparatus, and in particular to an improved battery-compartment arranged for a lawn-care apparatus.

Many battery powered lawn-care apparatuses, for example lawnmowers, employ removable batteries which are insertable by lowering them into a downwardly-inclined (vertical or sloped) battery-compartment. Battery compartments of this type typically include an openable cover to protect the battery compartment and its contents, e.g. from rain.

Problems associated with such devices include difficulty in loading/unloading the battery due to the placement and orientation of the battery-compartment, and a loss of balance of the law-care device owing to the location of the battery.

Whilst a vertical-loading battery may initially be easy to install since the installation is aided by gravity, they can be difficult to remove from the lawn-care apparatus due to the weight and downward orientation of the battery. The end user must remove the battery from the lawn-care apparatus by lifting the battery with his or her fingers, sometimes also by pinching the side of the battery. This can be uncomfortable and awkward for the end user to lift such a weight from the lawn-care apparatus.

Typically, such battery-compartments are provided with an openable cover to protect the battery-compartment and battery from exposure. However, these covers are frequently self-closing, under either gravity or spring-assisted, and the end user is therefore often forced to use one hand to hold open the battery-compartment cover, thus only one remaining hand is available for removal of the battery.

Lawn-care apparatus known in the art also employ mid-mounted or rear-mounted battery-compartments for mid-mounted or rear-mounted batteries. As the grass box of the lawn-care apparatus is filled with grass clippings, the centre of gravity of the apparatus is shifted significantly towards the rear of the device (with respect to the normal operating direction of the apparatus). Mid-mounted or rear-mounted batteries only compound this problem by being located towards the rear of the apparatus, thus the front of the apparatus is more likely to lift from the ground when in use, and fail to engage the lawn properly causing an uneven cut and possibly lawn damage. Typically, extra ballast must be installed at the front of the lawn-care apparatus to address this problem.

Accordingly there is a need for an improved battery-compartment arrangement.

SUMMARY

According to the disclosure there is provided, in its broadest sense, a lawn care apparatus having a battery-compartment comprising electrical contacts for engaging with a battery. The battery-compartment further comprises a roof section which protects the battery-compartment, substantially preventing any precipitation entering the battery-compartment and reaching the electrical contacts. A battery may be inserted or ejected from the battery-compartment, without needing to displace the roof section. This allows the battery to be easily inserted or ejected from the battery-compartment without the need to operate a cover, therefore both hands are free.

Preferably the battery-compartment has an access opening for inserting and ejecting a battery, and the battery-compartment is substantially horizontal or upwardly-inclined with respect to the operating plane of the apparatus, and away from the opening. The substantially horizontal/or upwardly-inclined battery-compartment means that any incidental precipitation will not run down the battery-compartment to the electrical contacts and cause damage.

Preferably, the battery-compartment opening is forward-facing, and more preferably the battery-compartment is located towards the front of the apparatus. This provides ballast to balance the effects of the grass box getting heavier through use, without the need to include extra mass, thereby increasing the overall weight, and construction cost, of the apparatus.

Preferably the apparatus has a removable battery to power the apparatus. The battery may be removed for easier charging.

Preferably, the apparatus comprises at least one front wheel aligned with the direction of operation of the apparatus, and the battery has a centre located no further than 150 mm behind the rotational centre of the wheel when the battery is correctly engaged with the battery-compartment, and even more preferably no further than 50 mm behind the rotational centre of the wheel. This maintains the battery near the front wheel(s) of the apparatus allowing the weight of the battery to assist in maintaining the balance of the device.

Preferably the apparatus further comprises a battery-engaging latch to engage with and retain a battery inserted in the compartment. This helps secure the battery in the battery-compartment and protect against accidental ejection of the battery during use.

Preferably the battery-engaging latch has a release lever to disengage the latch from the battery.

Preferably the battery-compartment is inclined at an angle of 5 or more degrees from the horizontal, so the battery descends under gravity from the battery-compartment when released.

Preferably the lawn-care apparatus is a ground-supported vegetation cutter, preferably a lawnmower, or a lawn rake or a scarifier.

Optionally, the battery-compartment opening has an openable cover which is hingeably attached. This cover helps prevent accidental ejection of the battery by covering the battery and associated latch during use of the apparatus.

Preferably, the apparatus comprises a deck section which houses the battery-compartment. This deck may be assembled separately to the cutting section of the lawn-care apparatus.

BRIEF DESCRIPTION OF THE DRAWINGS

The above, and other aspects of the present disclosure will now be described in further detail, by way of example only, with reference to the accompanying drawings, in which.

DETAILED DESCRIPTION

For clarity, only the essential components for an understanding of the present disclosure are illustrated and specifically described herein. The remainder of the apparatus will be understood by the skilled person as being conventional.

As shown in FIGS. 1 to 5, there is provided a lawn-care apparatus, such as a lawnmower (100) comprising a deck cover (110) mounted to the top of the main lawnmower chassis, and four wheels (500) arranged two on each side at either end (not all shown). The normal forward direction of operation of the lawnmower (100) is indicated in each figure by the arrow (OD).

The deck cover (110) includes a battery-compartment (200) situated towards the front of the lawnmower (100). The battery-compartment (200) is a substantially elongate space for receiving and securing a battery (400). The battery-compartment (200) has an upper roof section (250) providing cover for the battery-compartment (200) and also a forward-facing opening (210) with respect to the operating direction (OD) of the lawnmower (100). The battery-compartment (200) is upwardly-inclined away from the forward-facing opening (210), at approximately 15° from the horizontal operating plane of the lawnmower (100).

Figure 1:
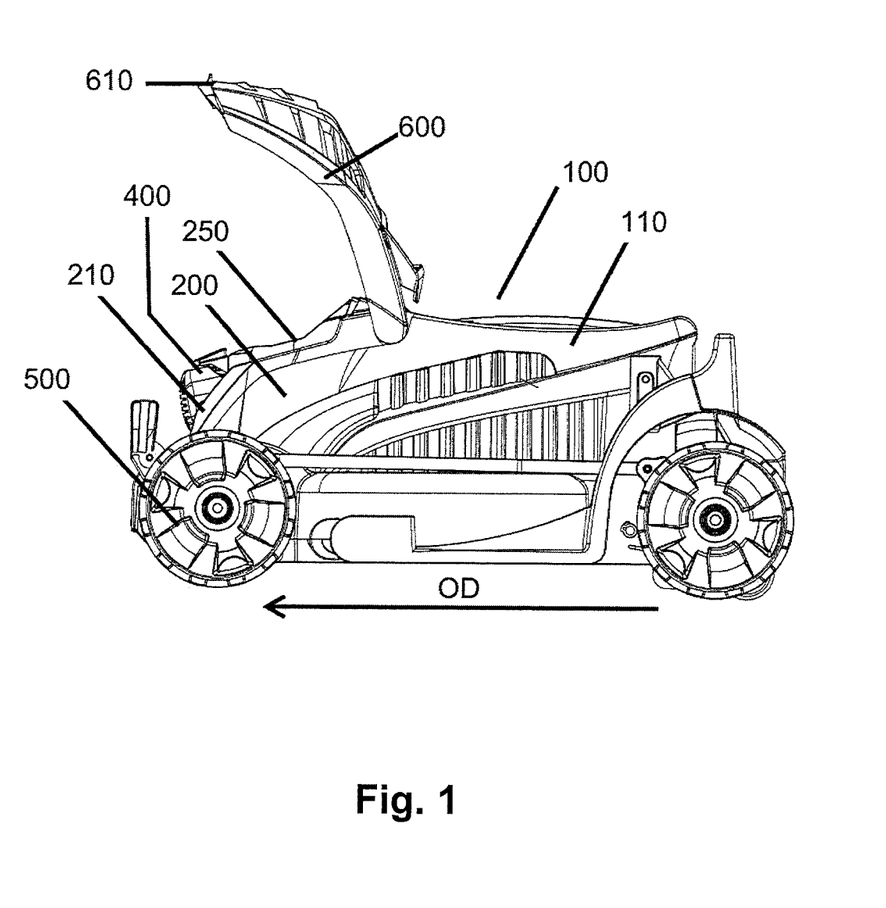
FIG. 1 is a side-on view of an embodiment of a lawn-care apparatus in accordance with the present disclosure with a battery inserted and battery-compartment cover open.
Figure 2:
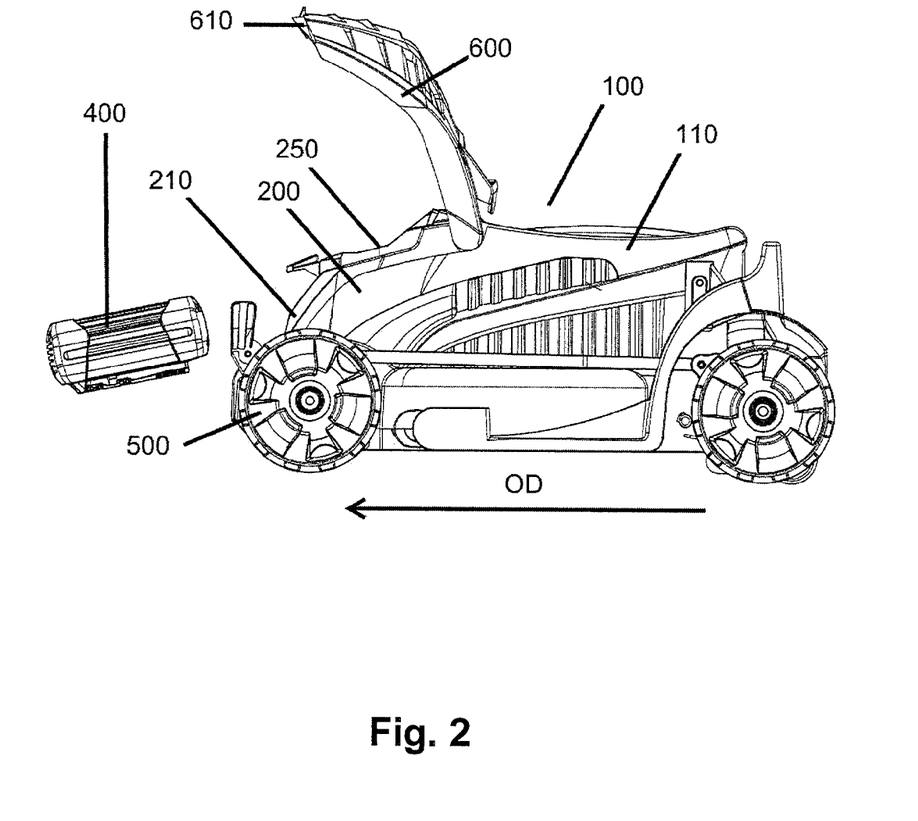
FIG. 2 is the side-on view of the lawn care apparatus of FIG. 1, with the battery in front of the battery-compartment.
Figure 3:
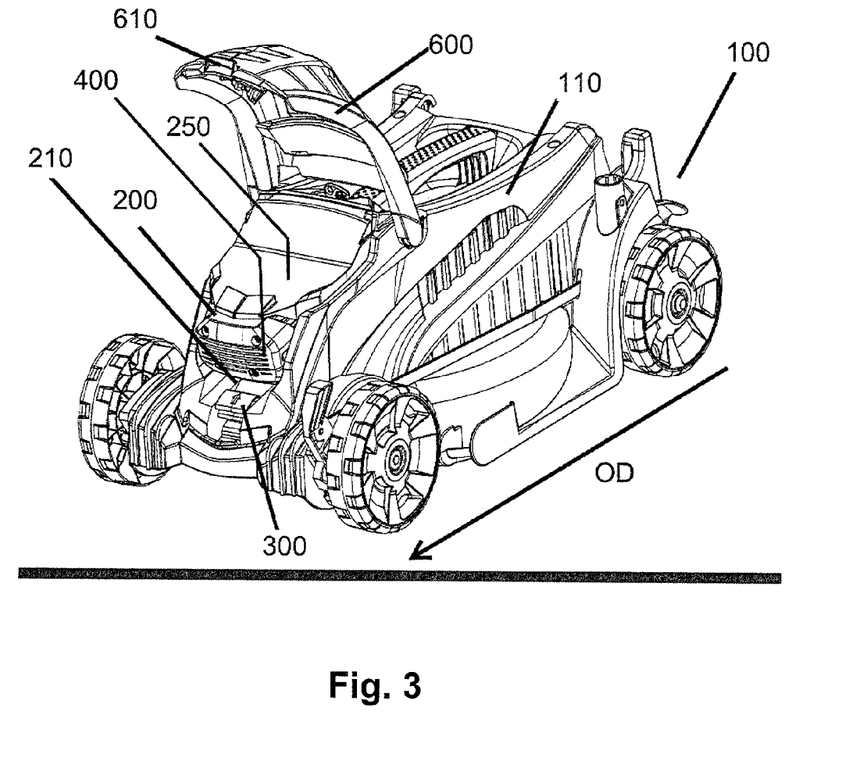
FIG. 3 is a perspective view of the lawn-care apparatus of FIG. 1, with the battery inserted, and the battery-compartment cover open.
Figure 4:
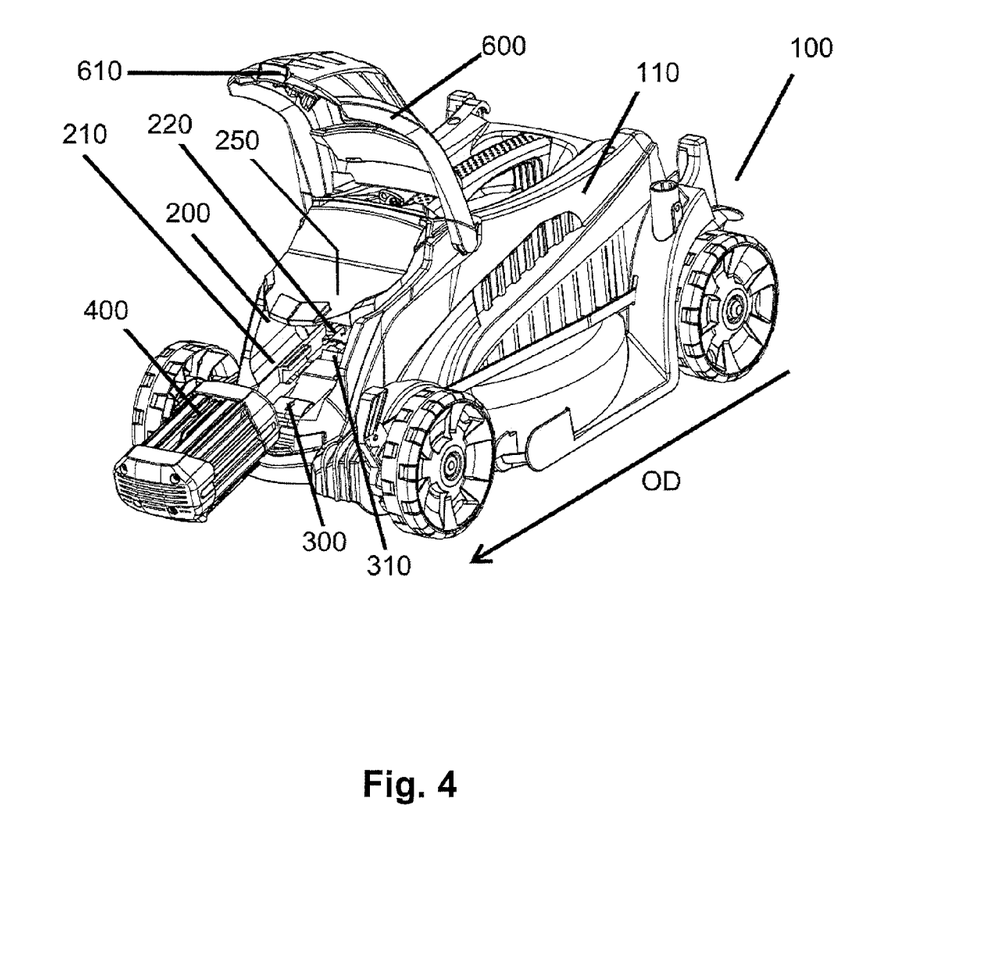
FIG. 4 is a perspective view of the lawn-care apparatus of FIG. 1, with the battery in front of the battery-compartment.

As shown in FIGS. 1 and 3, a removable battery (400) comprising cells within a housing is placeable inside the battery-compartment (200). As shown in FIGS. 2 and 4, the battery (400) is releasable from the battery-compartment (200). The battery (400) is configured with a number of grooves on its underside (not shown) to engage with a series of complementary engagement means (not shown) on the lower surface of the battery-compartment (200), ensuring the battery (400) sits properly in the battery-compartment (200).

As shown in FIG. 4, the battery-compartment (200) has one or more electrical contacts (220) for engaging with the battery (400) when the battery (400) is fully engaged with the battery-compartment (200). The contacts (220) are situated towards the rear of the upwardly-inclined battery-compartment (200) under the roof section (250), away from the opening (210). Owing to the inclination of the battery-compartment (200) away from the opening (210), the contacts (220) are therefore sheltered and protected from water, rain and other precipitation by the roof section (250) at the rear of the battery-compartment (200).

As can be seen in FIG. 4, the battery-compartment (200) further comprises a battery-engaging latch (310) towards the rear of the battery-compartment (200) for engaging with the underside of the battery (400) when it is successfully inserted into the battery compartment (400). The latch (310) prevents the battery (400) from disengaging with the electrical contacts (220) and being accidentally ejected from the battery-compartment (200). The latch (310) is pivotally connected to the battery-compartment (200) and further comprises a release lever (300) at one end of the pivotal latch (310), visible in FIGS. 3 and 4. The battery (400) has a corresponding detent (not shown) for engaging with the battery-engaging latch (310) maintaining the battery (400) in position within the battery-compartment (200) until the battery-engaging latch (310) is lowered by operation of the release lever (300).

The deck cover (110) further comprises a battery-compartment cover (600). The cover (600) is hingeably attached to the deck cover (110) rearward of the battery-compartment opening (210) and acts to provide an additional level of protection to the battery (400) and the electrical contacts (220) inside the battery-compartment (200). The cover (600) closes over the opening (210), and opens to provide access to the battery-compartment (200). The cover (600) is shown in an open position in FIGS. 1 to 4, and a closed position in FIG. 5.

Figure 5:
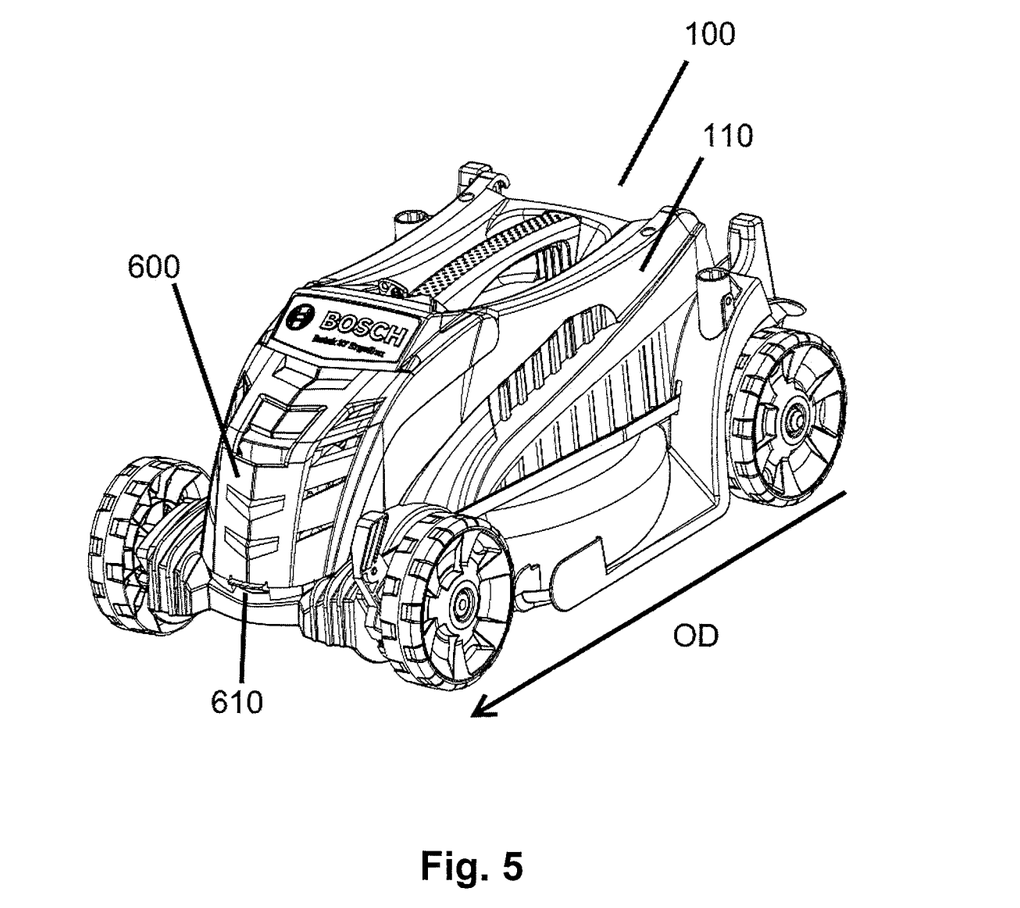
FIG. 5 is a perspective view of the lawn-care apparatus of FIG. 1, with the battery-compartment cover closed.

The cover (600) also comprises a latch (610) which engages with the deck cover (110) at the opposite end from the hinged attachment to the deck cover (110). The latch (610) provides a further level of security, preventing the cover (600) accidentally opening without user interaction.

To insert a battery (400) into the empty battery-compartment (200), the cover latch (610) is released to allow the cover (600) to be moved from a closed position (FIG. 5) to an open position (FIGS. 1 to 4). With the cover (600) in the open position, the battery-compartment (200) is accessible through the opening (210), and without the need to move the roof section (250). The battery-compartment (200) is arranged so that the battery (400) may be inserted into the battery-compartment (200) through the opening (210) without displacing the roof section (250). The battery (400) is placed in front of the opening (210) (see FIGS. 2 and 4) and correctly aligned so that the grooves on the underside of the battery (400) align with the corresponding means in the battery-compartment (200) and the electrical contacts on the battery (400) will engage with the contacts (220) inside the battery-compartment (200). The battery-compartment (200) is angled upwardly away from the opening (210) (with respect to the operating plane of the lawn mower) at approximately 15°. Therefore, in order to insert the battery (400) into the battery-compartment (200), the battery (400) must be pushed upwards, into the battery-compartment (200) through the opening (210) until the battery (400) engages with the electrical contacts (220) at the rear of the battery-compartment (200) with respect to the operating direction (OD) of the lawn-mower (100). Throughout the insertion of the battery, the roof section (250) provides cover for the electrical contacts (220) inside the battery-compartment (200).

Once the battery (400) is fully engaged with the battery-compartment (200) and the electrical contacts (220), the battery-engaging latch (310) engages with the underside of the battery (400), securing the battery (400) in place inside the battery-compartment (200). The cover (600) may then be lowered over the opening (210) and the cover latch (610) engaged with the deck cover (110).

When the battery (400) is correctly engaged in the battery-component (200), the battery (400) has a centre located about 30 mm behind the rotational axis of the front wheel (500) with respect to the operating direction of the lawnmower. The lawnmower (100) may then be operated with power being delivered from the battery (400) via the contacts (220) to the motor (not shown) of the lawnmower (100).

The location of the battery (400) near the front of lawnmower (100) when correctly engaged with the contacts (220) means that the battery's weight is able to off-set some of the imbalance caused by the weight of the grass box (not shown) at the rear of the device (with respect to the operating direction (OD) of the lawnmower (100)). Therefore, additional ballast may be avoided. Manufacturing costs may also be reduced.

In order to remove the battery (400) from the battery-compartment (200) of the lawnmower (100), the opposite procedure to the one detailed above is carried out. The cover latch (610) is released, and the cover (600) is opened so that the opening (210) of the battery-compartment (200) is accessible. The pivotally-attached battery-engaging latch (310) is released, by operating the release lever (300) from the end of the battery-compartment (200). Owing to the inclined nature of the battery-compartment (200), the battery (400) descends under gravity out of the battery-compartment (200) automatically upon release of the latch (310). The user catches the battery (400) and removes it from the battery-compartment (200). Throughout the ejection, the roof section (250) remains in place, providing cover to the electrical contacts (220). There is no need to displace the roof section (250) to gain access to insert or eject the battery (400).

The process of installing, and removing the battery (400) from the battery-compartment (200) of the lawnmower (100) is improved by the upwardly-inclined nature of the battery-compartment (200). Owing to the upwardly-inclined nature of the battery-compartment (200), even when the battery (400) is not installed (e.g. during charging), the electrical contacts (220) are protected from any incidental rainfall/precipitation by the roof (250) of the battery compartment (200). The forward-facing opening (210) allows insertion and ejection to be carried out without any obstacles getting in the way, and the forward placement of the battery (400) in the battery-compartment (200) provides a useful counterweight to the grass box (not shown) of the lawnmower (100), removing the need for additional front ballast to balance the lawnmower (100) in use.

In alternative embodiments (not shown), the battery housing (400) is configured to be self-sealing with respect to the battery compartment (200) to provide additional protection from the elements. In another embodiment (not shown), the battery-compartment (200) and opening (210) do not face directly forward with respect to the operating direction (OD) of the lawnmower (100) but instead are angled away from the forward direction, e.g. to allow side-loading of the battery (400). The battery compartment (200) may also be substantially horizontal with respect to the operating plane of the lawnmower (100).

In a further embodiment, the battery-compartment may be angled at any angle above the horizontal operating plane of the lawnmower (100).

The lawn-care apparatus could also be any ground-supported vegetation cutter, e.g. a lawn rake or scarifier.

In a further embodiment, the lawnmower (100) does not comprise the hingeably attached cover (600). A battery (400) can be installed/ejected without the need to hold open the battery-compartment cover (600) with one hand. Throughout the installation/ejection process, and with the battery (400) either installed or removed from the battery-compartment (200), the electrical contacts (220) remain shielded by the roof-section (250) and any incidental precipitation will not reach the contacts (220) through the opening (210) thanks to the inclination of the battery-compartment (200).

In another embodiment, the centre of mass of the battery (400) may be situated anywhere up to 150 mm behind the rotational axis of the front wheel(s) (500) with respect to the operating direction (OD) of the apparatus.

While the embodiments described herein are intended as an exemplary lawn-care apparatus, it will be appreciated by those skilled in the art that the present disclosure is not limited to the embodiments illustrated. Those skilled in the art will envision many other possible variations and modifications by means of the skilled person's common knowledge without departing from the scope of the disclosure as defined herein.

the invention claimed is:

1. A lawn-care apparatus, comprising:
   a deck section; and
   a battery-compartment accessible from above the deck section and including:
      electrical contacts configured to engage with a battery, and
      a roof section configured to substantially prevent precipitation from entering the battery-compartment and reaching the electrical contacts without obstructing an access opening to the battery compartment, such that the battery can be inserted into or ejected from the battery-compartment through the access opening without displacing the roof section.

2. The lawn-care apparatus according to claim 1, wherein:
   the battery-compartment is upwardly-inclined with respect to a horizontal operating plane of the apparatus, and away from the access opening.

3. The lawn-care apparatus assembly according to claim 1, wherein the access opening is forward-facing with respect to an operating direction of the apparatus.

4. The lawn-care apparatus assembly according to claim 3, wherein the battery-compartment is located towards a front of the apparatus, with respect to the operating direction of the apparatus.

5. The lawn-care apparatus assembly according to claim 1, further comprising a removable battery configured to be removably engaged with the battery-compartment.

6. The lawn-care apparatus assembly according to claim 5, further comprising:
   at least one front wheel and at least one rear wheel aligned with a direction of operation of the apparatus, wherein the removable battery has a center of mass located no further than 150 mm behind a rotational axis of the at least one front wheel with respect to the direction of operation of the apparatus, when the removable battery is engaged with the battery-compartment.

7. The lawn-care apparatus assembly according to claim 6, wherein the center of mass is located no further than 50 mm behind the rotational axis of the at least one front wheel.

8. The lawn-care apparatus assembly according to claim 1, further comprising a battery-engaging latch configured to engage with, and retain, a removable battery when the removable battery is inserted in the battery-compartment.

9. The lawn-care apparatus assembly according to claim 8, wherein the battery-engaging latch has a release lever configured to disengage the battery-engaging latch from the removable battery when the removable battery is inserted into the battery-compartment.

10. The lawn-care apparatus assembly according to claim 1, wherein the battery-compartment is inclined at an angle greater than 5° from the horizontal operating plane.

11. The lawn-care apparatus assembly according to claim 10, further comprising:
   a battery engaging latch, wherein the lawn-care apparatus assembly is configured such that a removable battery inserted into the battery-compartment is automatically ejected under gravity from the battery-compartment upon release of the battery-engaging latch.

12. The lawn-care apparatus assembly according to claim 1, wherein the lawn-care apparatus is a ground-supported vegetation cutter.

13. The lawn-care apparatus assembly according to claim 1, wherein the access opening further comprises a hinged cover configured to be pivoted between an open position whereat a removable battery can be inserted into and removed from the battery-compartment and a closed position whereat the removable battery cannot be inserted into or removed from the battery-compartment.

14. The lawn-care apparatus assembly according to claim 1, wherein the deck section includes the battery-compartment, wherein the access opening is accessible from above the deck section.

15. A lawn-care apparatus, comprising:
a deck section; and
a battery-compartment including:
electrical contacts configured to engage with a battery, and
a roof section configured to substantially prevent precipitation from entering the battery-compartment and reaching the electrical contacts without obstructing an access opening to the battery compartment, such that the battery can be inserted into or ejected from the battery-compartment through the access opening from the deck section without displacing the roof section.

16. The lawn-care apparatus according to claim 15, wherein:
the battery-compartment is upwardly-inclined with respect to a horizontal operating plane of the apparatus, and away from the access opening.

* * * * *